US008892359B2

(12) United States Patent
Wippler

(10) Patent No.: US 8,892,359 B2
(45) Date of Patent: Nov. 18, 2014

(54) SYSTEMS AND METHODS FOR ESTIMATING TIME OF ARRIVAL FOR VEHICLE NAVIGATION

(71) Applicant: Toyota Motor Engineering & Manufacturing North America, Inc., Erlanger, KY (US)

(72) Inventor: Erik Anthony Wippler, Canton, MI (US)

(*) Notice: Subject to any disclaimer, the term of this patent is extended or adjusted under 35 U.S.C. 154(b) by 1 day.

(21) Appl. No.: 13/739,919

(22) Filed: Jan. 11, 2013

(65) Prior Publication Data
US 2014/0200804 A1 Jul. 17, 2014

(51) Int. Cl.
G01C 21/00 (2006.01)
G01C 21/14 (2006.01)
G01C 21/34 (2006.01)
G08G 1/123 (2006.01)

(52) U.S. Cl.
CPC .................................. G01C 21/00 (2013.01)
USPC ............ 701/465; 701/104; 701/117; 701/118; 701/119; 701/120; 701/123; 701/414; 701/423

(58) Field of Classification Search
CPC ............ G01S 5/0027; G01S 2205/008; G08G 1/096811; G08G 1/123; G06Q 10/08
USPC .......... 701/104, 117–120, 123, 414, 423, 465
See application file for complete search history.

(56) References Cited

U.S. PATENT DOCUMENTS 6,144,917 A 11/2000 Walters
6,278,936 B1 8/2001 Jones
6,708,108 B2 3/2004 Jones
7,206,720 B2* 4/2007 LaPant .......................... 702/182
7,835,859 B2* 11/2010 Bill ............................... 701/424
8,315,788 B2* 11/2012 Surnilla et al. ................ 701/123
2003/0163249 A1* 8/2003 Kapolka et al. ............... 701/123
2007/0090937 A1* 4/2007 Stabler ....................... 340/450.2
2008/0027639 A1* 1/2008 Tryon ........................... 701/209
2008/0103686 A1 5/2008 Alberth et al.
2008/0114528 A1* 5/2008 Seacat et al. ................. 701/117
2008/0221787 A1* 9/2008 Vavrus ......................... 701/201
2009/0105897 A1 4/2009 Breslau et al.
2009/0157289 A1* 6/2009 Graessley .................... 701/123

(Continued)

OTHER PUBLICATIONS

Website document "ETA/Out-of-Route" from www.mcleodsoftware.com/freight-management-solutions-ETA-Program-load-master.aspx. 1 Page. Jan. 29, 2012.

Primary Examiner — Mary Cheung
Assistant Examiner — Atul Trivedi
(74) Attorney, Agent, or Firm — Dinsmore & Shohl LLP

(57) ABSTRACT

Systems and methods for estimating time of arrival for vehicle navigation are described. One embodiment of a method includes determining a route for a vehicle to reach a destination from a current location determining, by the computing device, an estimated time for reaching the destination from the current location. Embodiments of the method additionally include determining, by the computing device, a current range of the vehicle, based on current fuel level and vehicle fuel efficiency and determining, by the computing device and based on the current range, whether the vehicle can reach the destination without refueling. Some embodiments include revising, by the computing device, the estimated time for reaching the destination to include a waypoint to refuel in response to determining that the vehicle cannot reach the destination without refueling and providing, by the computing device, the estimated time for reaching the destination for display to a user.

20 Claims, 8 Drawing Sheets

(56) References Cited

U.S. PATENT DOCUMENTS

| | | | |
|---|---|---|---|
| 2009/0271107 A1* | 10/2009 | Smith | 701/201 |
| 2010/0052948 A1* | 3/2010 | Vian et al. | 340/963 |
| 2010/0138142 A1* | 6/2010 | Pease | 701/123 |
| 2010/0148952 A1* | 6/2010 | Barajas | 340/450.2 |
| 2010/0198508 A1* | 8/2010 | Tang | 701/210 |
| 2011/0112717 A1* | 5/2011 | Resner | 701/33 |
| 2011/0153141 A1* | 6/2011 | Beechie et al. | 701/29 |
| 2011/0160990 A1* | 6/2011 | Mineta | 701/123 |
| 2011/0184642 A1* | 7/2011 | Rotz et al. | 701/201 |
| 2011/0257869 A1* | 10/2011 | Kumar et al. | 701/103 |
| 2012/0053825 A1* | 3/2012 | Schunder | 701/123 |
| 2012/0059681 A1 | 3/2012 | Meyer et al. | |
| 2012/0179314 A1* | 7/2012 | Gilman et al. | 701/22 |
| 2012/0179359 A1* | 7/2012 | Profitt-Brown et al. | 701/123 |
| 2012/0221234 A1* | 8/2012 | Sujan et al. | 701/123 |
| 2013/0096818 A1* | 4/2013 | Vicharelli et al. | 701/423 |
| 2013/0226443 A1* | 8/2013 | Scofield et al. | 701/123 |
| 2013/0325335 A1* | 12/2013 | Kee et al. | 701/527 |
| 2014/0107913 A1* | 4/2014 | Vicharelli et al. | 701/123 |

* cited by examiner

SYSTEMS AND METHODS FOR ESTIMATING TIME OF ARRIVAL FOR VEHICLE NAVIGATION

TECHNICAL FIELD

Embodiments described herein generally relate to systems and methods for estimating time of arrival for vehicle navigation and, specifically, to determining way-points and predicting times for stopping at the way-points in time of arrival calculations.

BACKGROUND

Many current vehicles are equipped with a navigation system to calculate an estimated time of arrival (ETA) to a destination. However, oftentimes this estimation does not take into account stops that the user may make along the route. While these navigation systems are helpful, they often underestimate and are otherwise inaccurate in predicting the time it will take to reach the destination.

Accordingly, a need exists for alternative vehicle routing and/or estimating time to a destination.

SUMMARY

Systems and methods for estimating time of arrival for vehicle navigation are described. One embodiment of a method includes determining, by a computing device, a route for a vehicle to reach a destination from a current location determining, by the computing device, an estimated time for reaching the destination from the current location. Embodiments of the method additionally include determining, by the computing device, a current range of the vehicle based on current fuel level and vehicle fuel efficiency and determining, by the computing device and based on the current range, whether the vehicle can reach the destination without refueling. Some embodiments include revising, by the computing device, the estimated time for reaching the destination to include a waypoint to refuel in response to determining that the vehicle cannot reach the destination without refueling and providing, by the computing device, the estimated time for reaching the destination for display to a user.

In another embodiment, a system includes an odometer for determining distances traveled by the vehicle, a fuel gauge for determining a current fuel level of the vehicle, and a computing device. The computing device stores logic that, when executed by a processor, causes the computing device to determine a distance for reaching a destination from a current location, determine a current range of the vehicle, based on the current fuel level and a vehicle fuel efficiency, and determine based on the current range, whether the vehicle can reach the destination without refueling. Additionally, in response to determining that the vehicle cannot reach the destination without refueling, the logic may cause the computing device to determine an estimated time for reaching the destination, wherein the estimated time for reaching the destination includes travel time to waypoint to refuel and a predicted refueling time. The logic may cause the computing device to provide the estimated time for reaching the destination for display to a user.

In yet another embodiment, a system includes a vehicle and a computing device. The computing device stores logic that, when executed by a processor, causes the computing device to determine an estimated time for reaching a destination from a current location, predict whether a waypoint will be taken before reaching the destination, and in response to determining that the vehicle will take the waypoint before reaching the destination, revise the estimated time for reaching the destination to include the waypoint. The logic may additionally cause the computing device to provide the estimated time for reaching the destination for display to a user.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for estimating time of arrival for vehicle navigation. Some embodiments are configured to determine if a stop will likely be made during the trip. As an example, the vehicle computing device may receive an indication regarding the current vehicle fuel level and may determine the vehicle fuel consumption and whether the vehicle can reach the destination without refueling. If not, the vehicle computing device may add a predetermined amount of time to the estimated time of arrival (ETA) to account for traveling to the waypoint and stopping to refuel. In this example, the additional time may be determined as a preset (or user identified) amount of time, based on whether the vehicle is an internal combustion engine (e.g., 10 minutes) or an electric engine (e.g., 4 hours). Similarly, some embodiments may be configured to dynamically calculate the additional time, based on past user actions, preferred fueling stations along the route, etc.

While the vehicle computing device may adjust the ETA based on refueling requirements of the vehicle, other factors may cause an adjustment to the ETA. As an example, if a user routinely stops at a particular point of interest along the route, or if the user routinely stops after a certain amount of travel time, the vehicle computing device may recognize these stops and the additional time that the stops add to the ETA. This additional time may be added to the ETA on future trips.

Accordingly, embodiments disclosed herein allow for greater accuracy in determining time of arrival, distance, and other factors of a trip. These embodiments may additionally provide more accurate routing of the vehicle, based on the determined stops.

Figure 1:
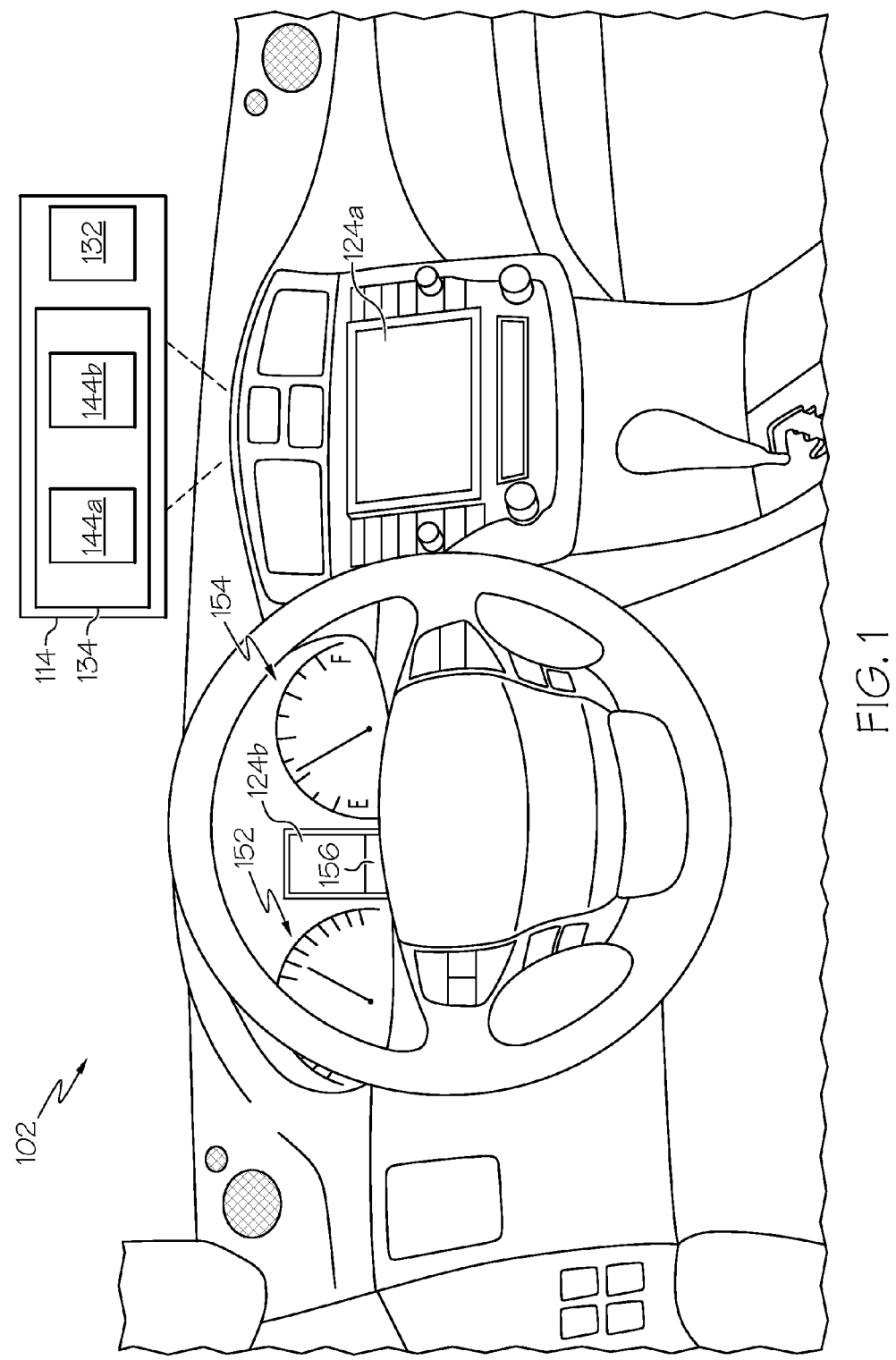
FIG. 1 depicts a vehicle interior according to embodiments disclosed herein.

Referring now to the drawings, FIG. 1 depicts a vehicle interior, according to embodiments disclosed herein. As illustrated, a vehicle 102 may include the vehicle interior with a console display 124a and a dash display 124b (referred to independently and/or collectively herein as "display device 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b.

The vehicle 102 also includes a speedometer 152, a fuel gauge 154, and an odometer 156. The speedometer 152 may be configured to determine a current speed of the vehicle 102. Similarly, the fuel gauge 154 may be coupled to a fuel sensor that determines a current level of fuel in the vehicle 102. The odometer 156 may determine a distance that the vehicle 102 has traveled over the life of the vehicle 102 and/or for a predetermined time period.

Figure 8:
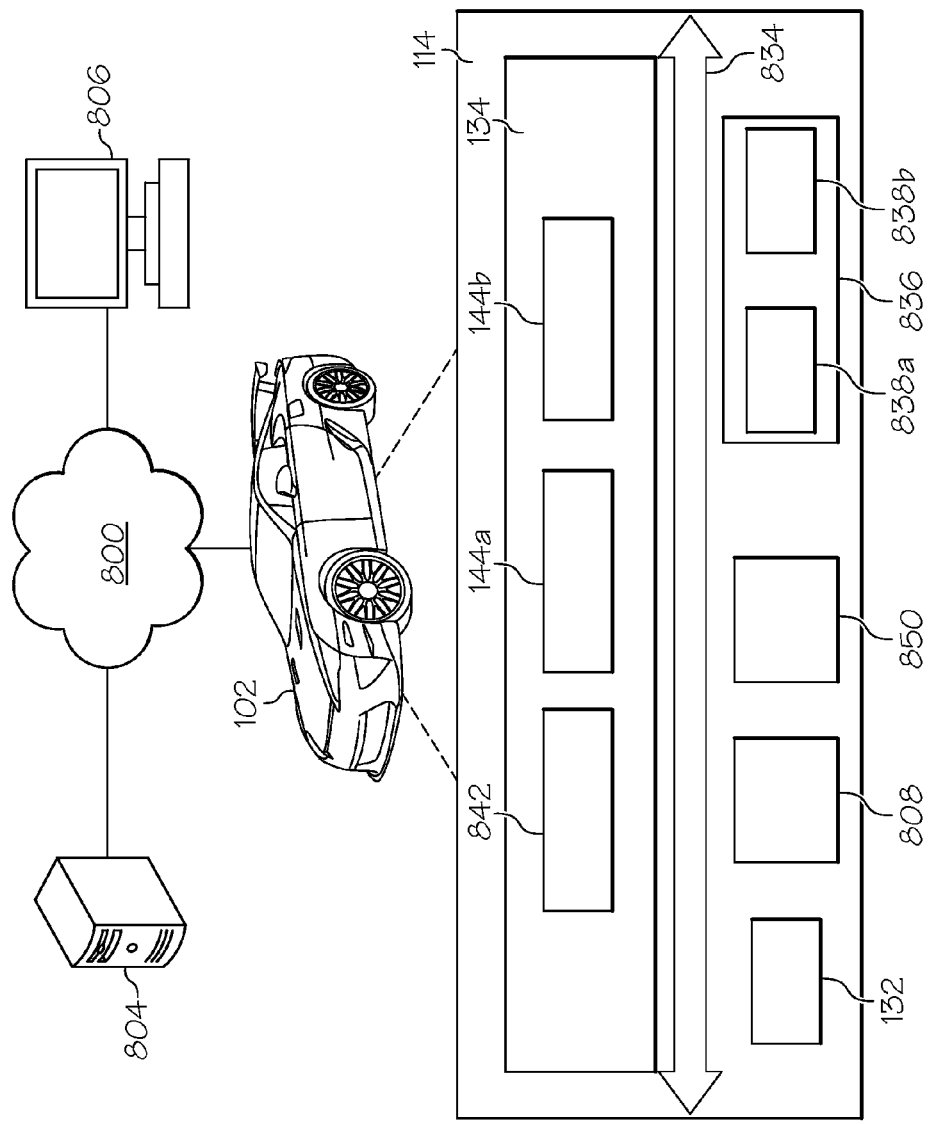
FIG. 8 depicts a vehicle computing device that may provide routing and/or estimated time of arrival data for the vehicle, according to embodiments disclosed herein.

Also included in the vehicle 102 is a vehicle computing device 114. The vehicle computing device 114 may be configured with a processor 132 and a memory component 134, which may store routing logic 144a and travel time logic 144b. The routing logic 144a and the travel time logic 144b may each include a plurality of different pieces of logic, each of which may be embodied as a computer program, firmware, and/or hardware, as an example. The routing logic 144a may be configured to cause the vehicle computing device 114 to determine navigational or routing data to the user. Specifically, the routing logic 144a may be configured as software for a navigation system or otherwise facilitate communication with satellite or other remote computing device to determine a current position, as well as a route to a destination. Similarly, the travel time logic 144b may be configured to cause the vehicle computing device 114 to determine a travel time for reaching the destination and predict waypoints, which may add time to reach the destination. Additional components of the vehicle 102 are depicted in FIG. 8 and described in more detail below.

It should be understood that while the vehicle computing device 114 may provide the functionality described herein, this is merely an example. In some embodiments, a remote computing device (such as the remote computing device 804 in FIG. 8) may be configured to determine vehicle position, routing, estimated time of arrival, and/or other information described herein.

Figure 2:
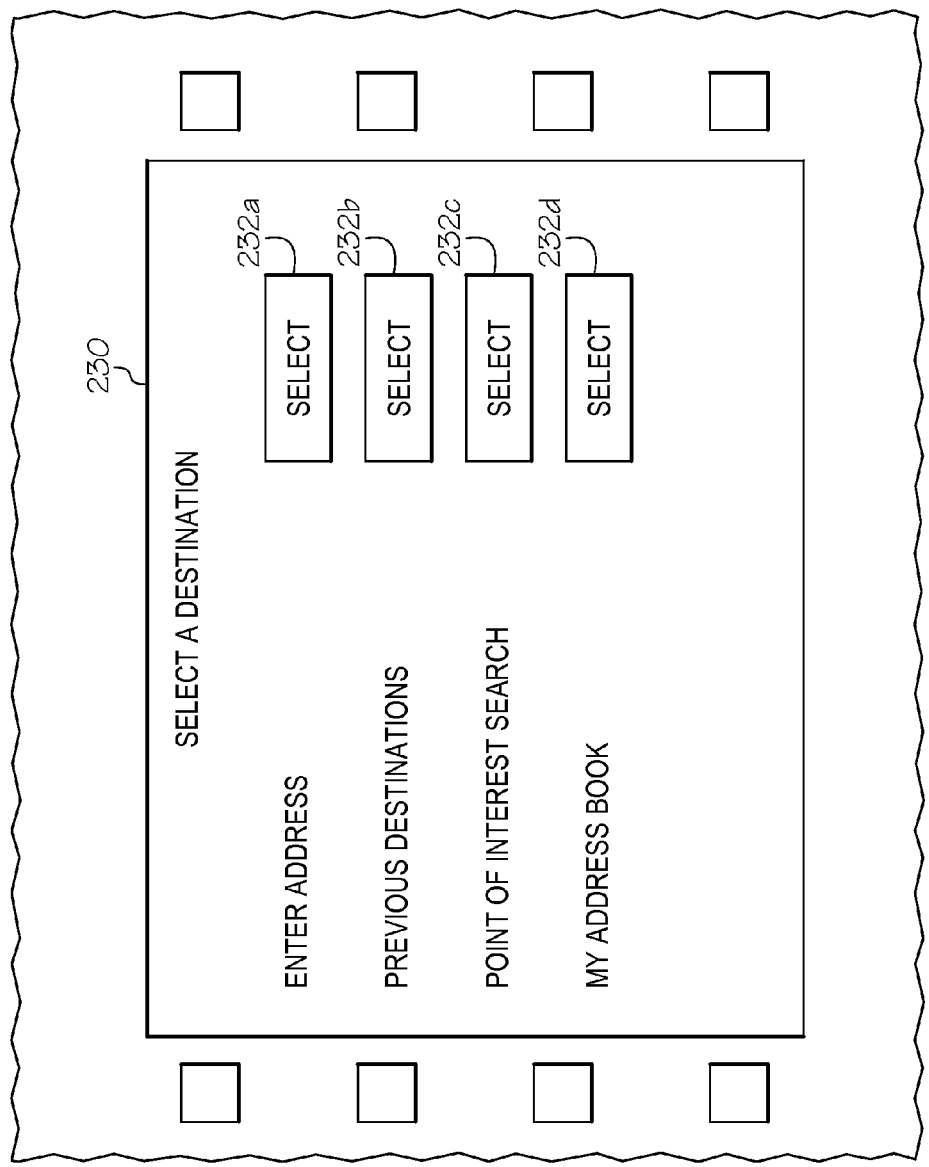
FIG. 2 depicts a user interface for selecting a destination that may be provided by a vehicle computing device, according to embodiments disclosed herein.

FIG. 2 depicts a user interface 230 for selecting a destination that may be provided by a vehicle computing device 114, according to embodiments disclosed herein. As illustrated, the user interface 230 may be provided to the user (driver and/or passenger) of the vehicle 102 to determine routing and/or an estimated time of arrival for reaching a destination. As discussed above, a determination may be made regarding the current position of the vehicle 102. Additionally, the user interface 230 may provide user options 232a, 232b, 232c, and 232d for determining a destination to which the user will be traveling.

It should be understood that while the user may manually enter the desired destination, as illustrated in FIG. 2, this is merely an example. In some embodiments, the vehicle computing device 114 may determine the destination based on past user actions and/or other information. Regardless of the manner in which the vehicle computing device 114 receives the destination, this information may be utilized for determining a route and/or a time of arrival to the destination, as described below.

Figure 3:
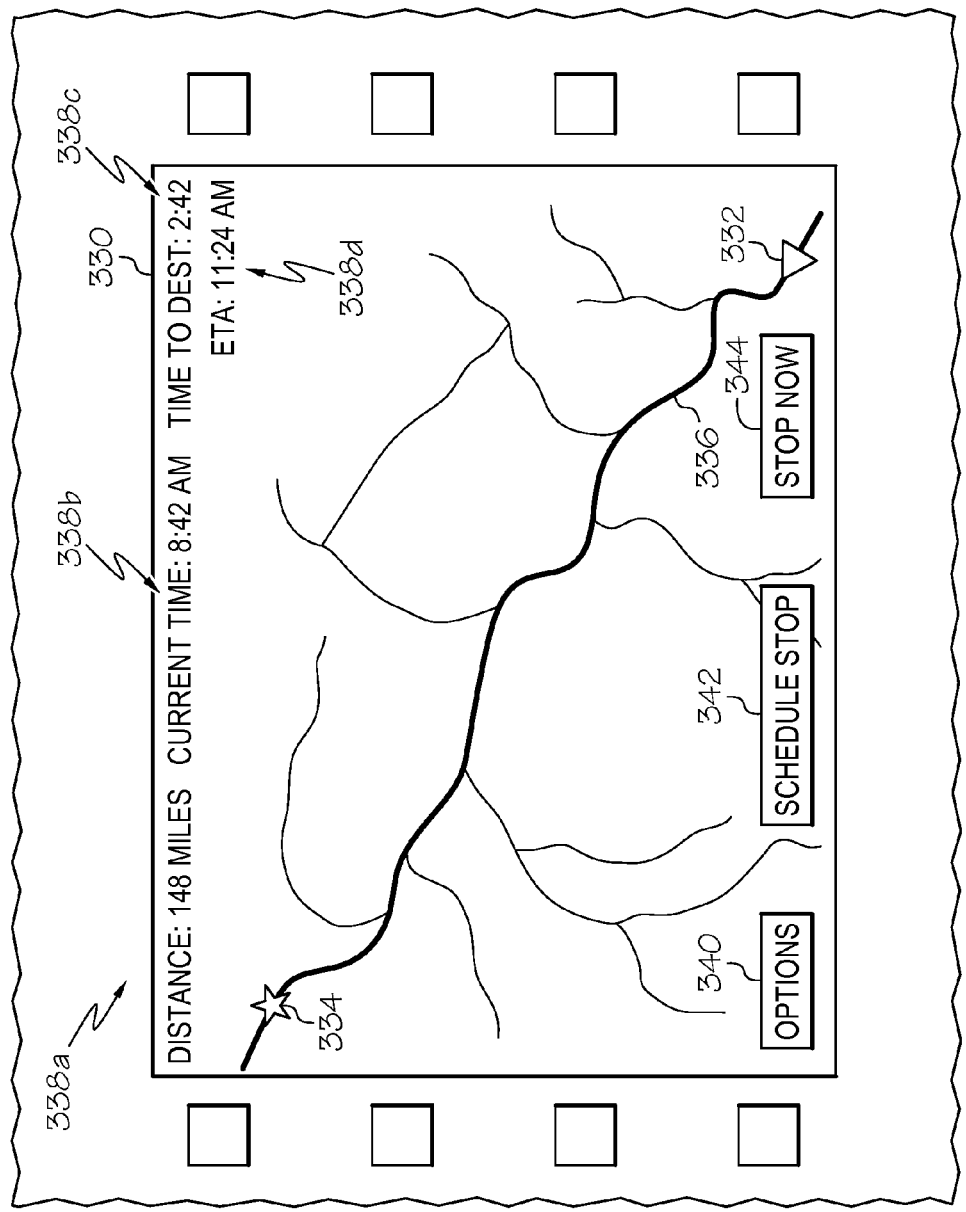
FIG. 3 depicts a user interface for viewing a route that may be planned by a vehicle computing device, according to embodiments disclosed herein.

FIG. 3 depicts a user interface 330 for viewing a route that may be planned by a vehicle computing device 114, according to embodiments disclosed herein. Based on the current position of the vehicle 102 and the destination, a route 336 may be determined for reaching the destination. This route 336 may be illustrated in the user interface 330, which shows a vehicle indicator 332 and a destination indicator 334. Also included in the user interface 330 is distance data 338a, current time data 338b, time to destination data 338c, and estimated time of arrival data 338d. The distance data 338a provides the linear distance from the current vehicle location to the destination. Specifically, the distance data 338a may be calculated by determining a route from the current vehicle location to the destination and determining distance the vehicle 102 will travel along the route to reach the destination.

The current time data 338b may provide the current time, which may be received from an internal clock and/or from a remote computing device. The time to destination data 338c may identify a predicted time for reaching the destination, based on the distance data 338a, as well as a speed that the vehicle 102 may travel along the route to reach the destination. In some embodiments, the vehicle computing device 114 may receive speed limit data for each of the roads that the vehicle 102 will traverse to reach the destination and utilize this data to determine the time to destination data 338c. In some embodiments however, the time to destination data 338c may be determined based on a predetermined default speed of the vehicle 102 (e.g., always use 55 miles per hour on highways and always use 35 miles per hour on non-highway roads). Similarly, the vehicle computing device 114 may utilize past user actions on those roads or other roads to determine the speed that the vehicle 102 will take to reach the destination. Regardless, with the speed data, the time to destination data 338c may be calculated. Similarly, the estimated time of arrival data 338d may be calculated from the time to destination data 338c and the current time data 338b. The estimated time of arrival data 338d may provide the estimated time of arrival for reaching the destination, based on the current time data 338b and the time to destination data 338c.

Also included in the user interface 330 are an options button 340, a schedule stop button 342, and a stop now button 344. Specifically, the options button 340 may provide options for more accurate routing and/or travel time information, as described below. The schedule stop button 342 may allow the user to provide a scheduling user input to manually schedule a stop for a future time. As an example, if the user (passenger or driver) knows that there will be a desire to refuel the vehicle 102 at a certain time or certain fuel level, the user may select the schedule stop button 342 to enter the nature of the stop. In this example, the stop will be a vehicle-based waypoint in the form of refueling. Accordingly, the user may additionally enter the desired time for stopping, the desired fuel level to trigger the waypoint, the desired destination of the waypoint, the desired fuel provider, and/or other information for the scheduling the waypoint stop. As described in more detail below, the vehicle computing device 114 may revise the route 336, the travel time, and/or the estimated time of arrival, based on a prediction of the time and/or distance to reach and stop at the waypoint.

Similarly, the user may provide an impromptu user input of the stop now button 344 to immediately route the vehicle 102 to the desired stopping point. As an example, if the vehicle 102 is low on fuel or if a restroom stop must be made immediately, the user may select the stop now button 344. In response, the vehicle computing device 114 may provide options for the type of stop, such as fuel stations and/or restrooms in the immediate vicinity.

Figure 4:
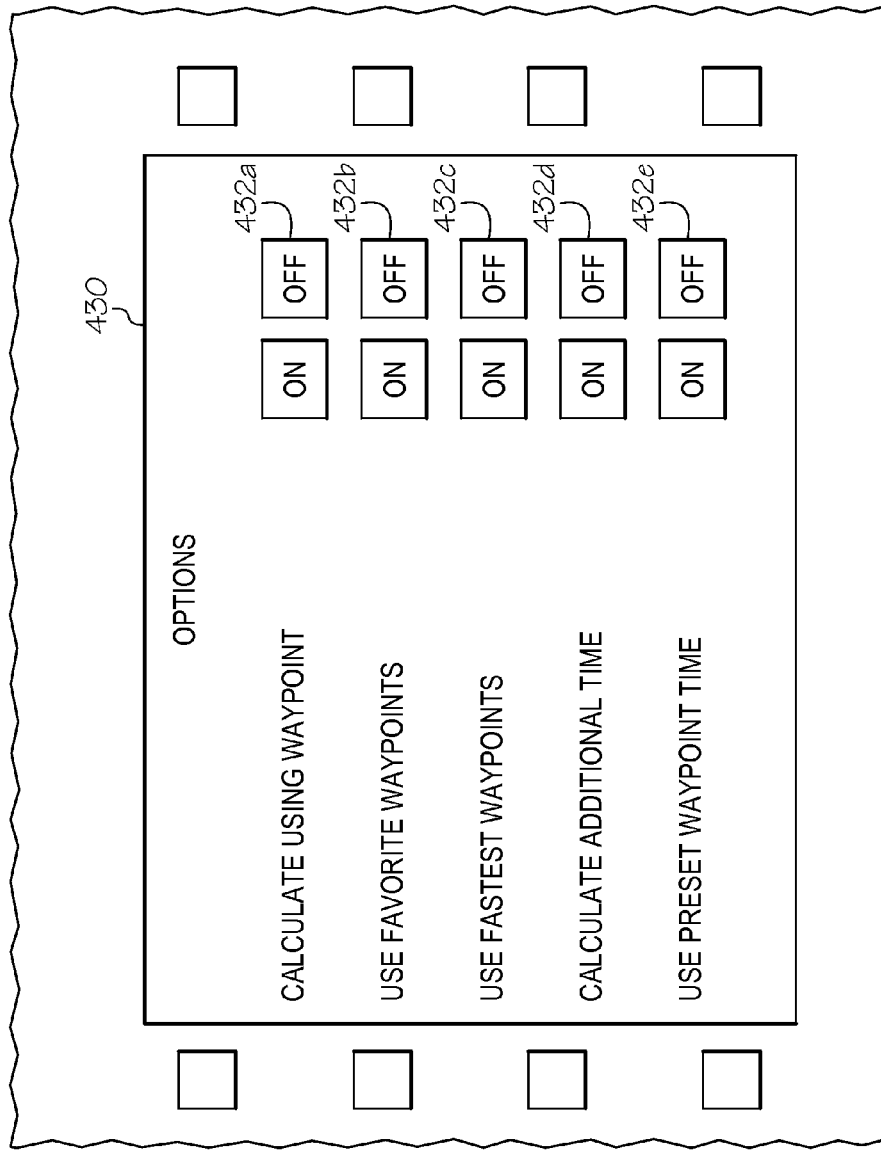
FIG. 4 depicts a user interface for providing one or more options related to calculating a time of arrival to a destination, according to embodiments disclosed herein.

FIG. 4 depicts a user interface 430 for providing one or more options related to calculating a time of arrival to a destination, according to embodiments disclosed herein. In response to selection of the options button 340 from FIG. 3, the user interface 430 may be provided and may include a calculate option 432a, a favorite option 432b, a fastest option 432c, an additional time option 432d, and a present time option 432e. By activating the calculate option 432a, the vehicle computing device 114 may calculate a time for reaching the waypoint and then the destination and include this calculation into the time to destination data 338c and/or the estimated time of arrival data 338d (FIG. 3). As an example, if a waypoint is determined to be a fuel stop, the vehicle computing device 114 may determine the exact fuel station where the vehicle 102 will stop. The vehicle computing device 114 may additionally determine the distance to the waypoint, the distance from the waypoint to the destination, and calculate a travel time based on that distance.

Similarly, the favorite option 432b may be selected to store and recall favorite waypoints of a user. Specifically, if a user always stops at a particular fuel brand, restaurant, highway exit, or other waypoint, the vehicle computing device 114 may store this information, such that recommendations and/or automatic routing and travel time may be provided. The fastest option 432c may be selected such that the vehicle computing device 114 determines a location and a predicted time for stopping at a plurality of candidate waypoints. The vehicle computing device 114 may then select the one or more waypoints which will add the least amount of time to the trip.

Also included are the additional time option 432d and the present time option 432e. Selection of the calculate additional time option 432d causes the vehicle computing device 114 to calculate the time that stopping at the waypoint will add to the travel time. As discussed above, the added time for traveling to the waypoint and from the waypoint to the destination may be calculated based on distance and speed. However, the additional time option 432d may also calculate the time that the stop itself will take. Accordingly, in response to selection of the additional time option 432d, the vehicle computing device 114 may predict an estimated time for the stop and add that additional time to the time to destination data 338c. The vehicle computing device 114 may predict the additional time, based on the type of waypoint stop, past user actions, a determined traffic flow at the waypoint, and/or from other data. As an example, if the vehicle 102 has an internal combustion engine, and the fuel tank of the vehicle 102 is empty, the vehicle computing device 114 may determine a normal amount of time for filling the tank. If the user generally refills the fuel tank only half full, the vehicle computing device 114 may account for that amount of time. Additionally, if the user always takes between 15 and 20 minutes at this waypoint, that information may be utilized for this calculation.

Similarly, the preset time option 432 may be selected to always utilize a preset time for determining waypoint stopping times. Specifically, if the preset time option 432 is selected and the waypoint is a gasoline stop, the vehicle computing device 114 may always add 6 minutes to the time to destination data 338c. If the waypoint is an electric vehicle refueling, the vehicle computing device 114 may always add 4.2 hours for recharging. Other stops may be automatically preset and in some embodiments, all waypoints may have a single preset time, regardless of the type of waypoint.

Figure 5:
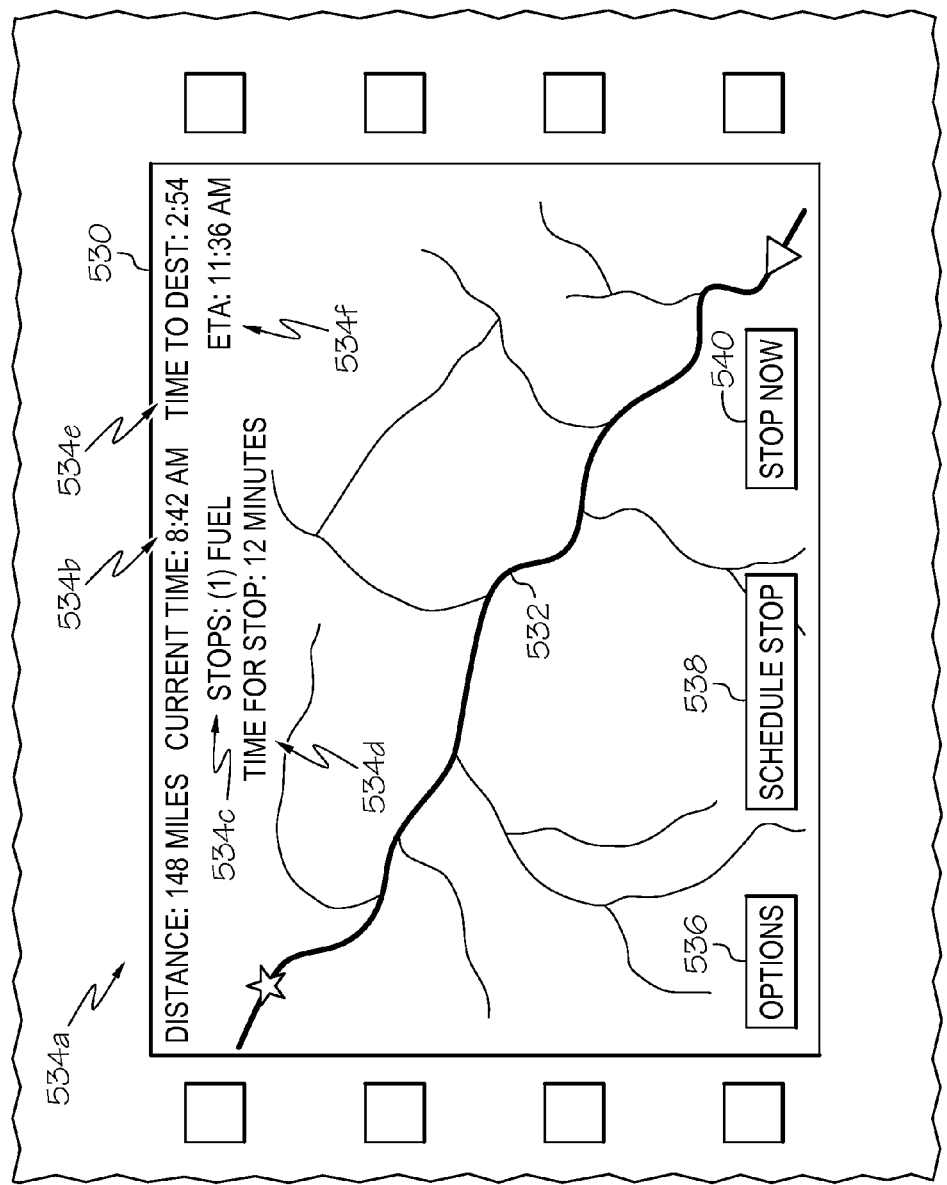
FIG. 5 depicts a user interface for calculating a time of arrival to a destination, while factoring in one or more waypoint stops, according to embodiments disclosed herein.

FIG. 5 depicts a user interface 530 for calculating a time of arrival to a destination, while factoring in one or more waypoint stops, according to embodiments disclosed herein. As illustrated in the user interface 530, a route 532 may be provided from the current location to the destination. Additionally, the user interface 530 includes destination data 534, which includes distance data 534a, current time data 534b, stop data 534c, time for stop data 534d, time to destination data 534e, and ETA to destination data 534f. Also included are an options button 536, a schedule stop button 538, and a stop now button 540.

Specifically, after a destination is determined, the vehicle computing device 114 may determine a waypoint that will be reached along the route. The waypoint may include vehicle-based waypoints and/or user-based waypoints. The vehicle-based waypoints may include any waypoint that is included to address some part of the vehicle 102. Examples include waypoints for predetermined fuel level (e.g., if the tank reaches an empty threshold), a predetermined maintenance level (e.g., if the oil alarm and/or maintenance alarm are activated), an expected fuel level (e.g., if the vehicle 102 will reach the empty threshold after a predicted amount of time based on current or historical fuel consumption), an expected maintenance level, a vehicle wash, a weather-related stop, etc. User-based waypoints include those that relate to the user (driver and/or passenger). Examples of user-based waypoints include waypoints for a restaurant stop, a restroom stop, an entertainment establishment stop, a hospital stop, a site seeing establishment stop, etc. User-based waypoints may also be determined in a number of ways, including utilizing previously stored user actions for predicting a waypoint along the route.

Regardless of the type of waypoint, the vehicle computing device 114 may determine the waypoint from any of a number of different mechanisms. As an example, the user may select the schedule stop button 538 to schedule a future waypoint along the route. In response to selection of the stop now button 540, the user may initiate location and routing of an impromptu waypoint in the immediate vicinity of the vehicle 102. Similarly, the vehicle computing device 114 may be configured to infer waypoints based an action of the vehicle 102 (such as exiting the highway unexpectedly), based on past user actions and/or based on stored settings. As an example, the vehicle computing device 114 may determine that vehicle 102 will not be able to reach the destination without refueling. Accordingly, the vehicle computing device 114 may automatically determine (such as from a user setting, a past user action, or other determination) a refueling station and add this vehicle-based waypoint to the route. In some embodiments, the vehicle computing device 114 may prompt the user for a desired refueling station.

Similarly, the vehicle computing device 114 may determine that at least one of the users will likely need a restroom break before reaching the destination. Accordingly, the vehicle computing device 114 may identify an approximate time that the restroom break will be needed and locate an appropriate establishment for this user-based waypoint. Similarly, if the vehicle 102 will not reach the destination before an eating time, a restaurant may be selected and/or included as a waypoint along the route. One or more such waypoints may be added to the route. If the user selects the stop now button 344 for a restroom break that is different than then inferred restroom break, the vehicle computing device 114 may remove the inferred waypoint stop, reroute and/or estimate ETA with the impromptu waypoint stop, and store the user input and waypoint stop for future waypoint inferences.

Once the one or more waypoints are determined, the vehicle computing device 114 may additionally determine whether the vehicle 102 will need to be rerouted from the route 336 (FIG. 3). If not, the route 336 and thus the distance data 338*a* may remain the same (as in route 532) and the waypoint stop may be accounted in the time to destination data 534*e* and the ETA to destination data 534*f*. If the vehicle 102 will be rerouted based on the waypoint, the rerouting may be performed, new distance data may be calculated, and the destination data and ETA data may be updated, as is described with reference to FIG. 6.

Figure 6:
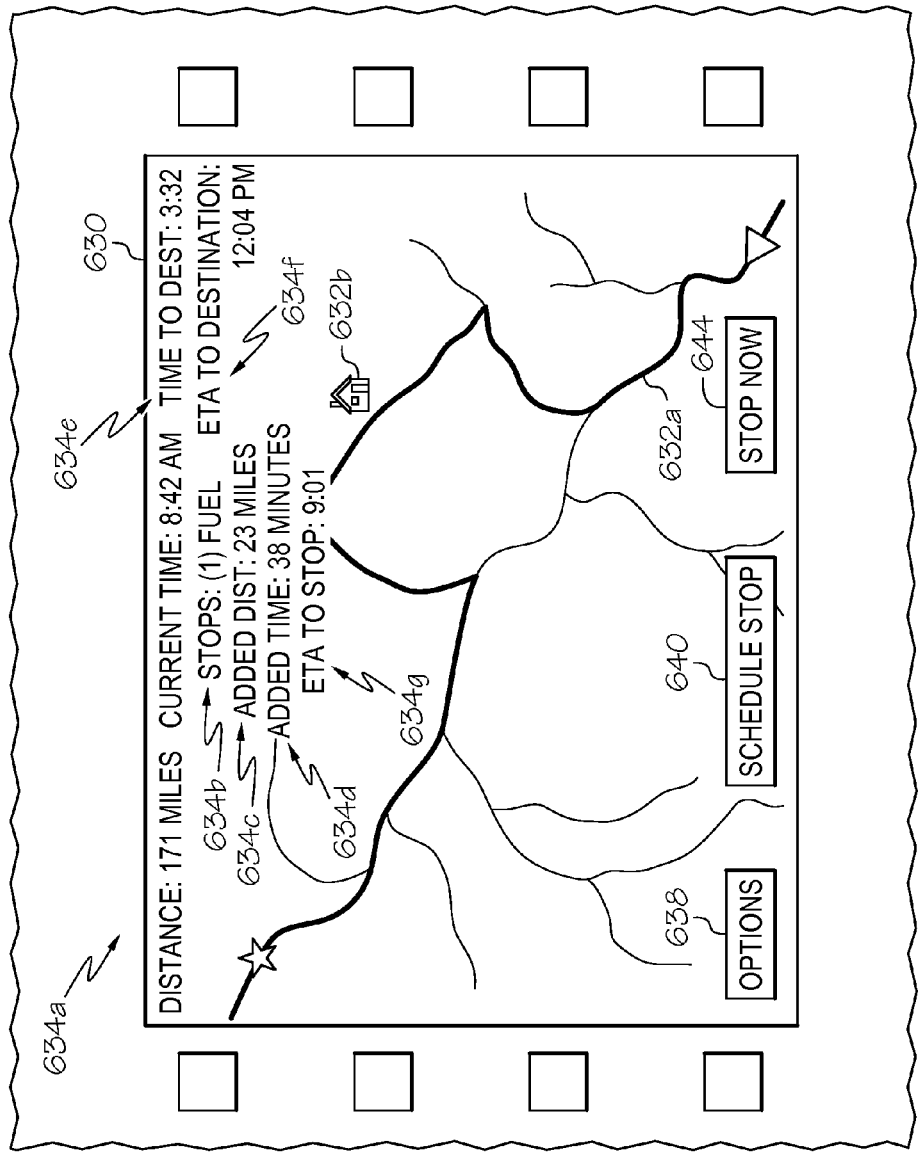
FIG. 6 depicts a user interface for predicting a waypoint stop in route to a destination, rerouting the vehicle based on the waypoint stop, and determining a time of arrival to the destination, according to embodiments disclosed herein.

FIG. 6 depicts a user interface 630 for predicting a waypoint stop in route to a destination, rerouting the vehicle 102 based on the waypoint stop, and determining a time of arrival to the destination, according to embodiments disclosed herein. As illustrated, the user interface 630 includes a revised route 632*a* that accounts for a determined waypoint. Specifically, a determination was made that the vehicle 102 would make a fuel stop at a fueling station. Upon determining the specific fueling station 632*b*, the vehicle computing device 114 determines whether the route needs to be altered to account for the waypoint. In the embodiment of FIG. 6, it is determined that the most efficient (or desired) route is to proceed according to the revised route 632*a*, which is different than the original route. Additionally, distance data 634*a* is changed to account for the waypoint.

Also included in the user interface 630 are stops data 634*b*, added distance data 634*c*, added time data 634*d*, time to destination data 634*e*, and ETA to destination data 634*f*. As illustrated, the time to destination data 634*e* and the ETA to destination data 634*f* are updated according to the added distance data 634*c*. ETA to stop data 634*g* is also provided to indicate when the vehicle 102 will reach the specific fueling station 632*b*.

Figure 7:
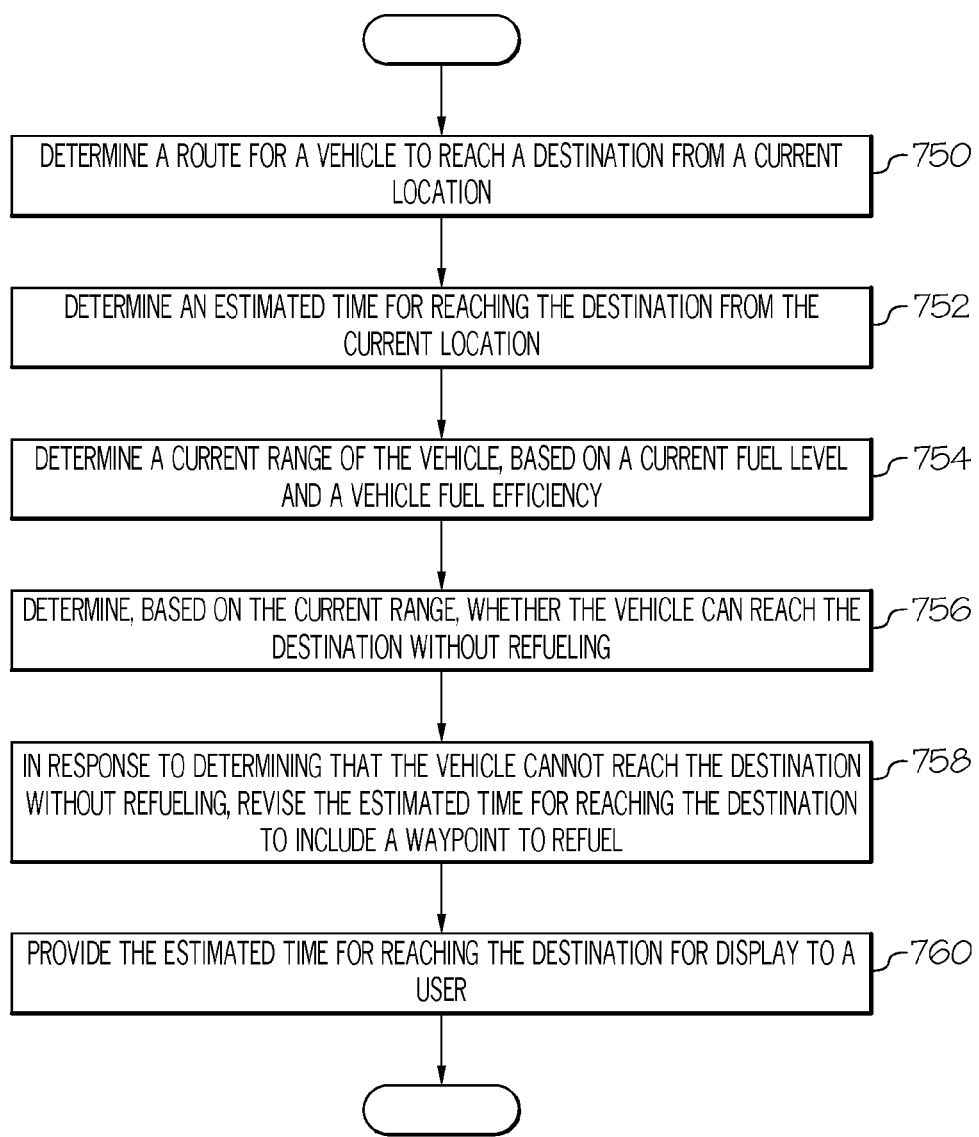
FIG. 7 depicts a flowchart for determining a time of arrival, based on a predicted waypoint stop, according to embodiments disclosed herein.

FIG. 7 depicts a flowchart for determining a time of arrival, based on a predicted waypoint stop, according to embodiments disclosed herein. As illustrated in block 750, a route for a vehicle may be determined to reach a destination from a current location. In block 752, an estimated time for reaching the destination from the current location may also be determined. In block 754, a current range of the vehicle may be determined, where this determination is based on current fuel level and vehicle fuel efficiency. In block 756, a determination, based on the current range, is made regarding whether the vehicle can reach the destination without refueling. In block 758, in response to determining that the vehicle cannot reach the destination without refueling, the estimated time for reaching the destination may be revised to include a waypoint to refuel. In block 760, the estimated time for reaching the destination may be provided for display to a user.

FIG. 8 depicts a vehicle computing device 114 that may provide routing and/or estimated time of arrival data for the vehicle, according to embodiments disclosed herein. The vehicle 102 is depicted in FIG. 8 as an automobile but may be any passenger or non-passenger vehicle such as, for example, a terrestrial, aquatic, and/or airborne vehicle may be included. The vehicle 102 may be coupled to a remote computing device 804 and/or a user computing device 806 for receiving content and/or other data via a network 800. The network may include a wide area network, local area network, and/or other wired or wireless network for communicating data, as described herein.

Also illustrated is the vehicle computing device 114, which includes the processor 132, input/output hardware 808, the network interface hardware 850, a data storage component 836 (which stores mapping data 838*a*, travel time data 838*b*, and/or other data), and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 114 and/or external to the vehicle computing device 114.

The memory component 134 may store operating logic 842, the routing logic 144*a* and the travel time logic 144*b*. The routing logic 144*a* and the travel time logic 144*b* may each include a plurality of different pieces of logic, each of which may be embodied as a computer program, firmware, and/or hardware, as an example. A local interface 834 is also included in FIG. 8 and may be implemented as a bus or other communication interface to facilitate communication among the components of the vehicle computing device 114.

The processor 132 may include any processing component operable to receive and execute instructions (such as from a data storage component 836 and/or the memory component 134). As described above, the input/output hardware 808 may include and/or be configured to interface with the components of FIG. 8. As an example, the input/output hardware 808 may include microphones, speakers, the display device 124, the fuel gauge 154, the speedometer 152, the odometer 156 (FIG. 1), and/or other hardware in the vehicle 102

The network interface hardware 850 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the vehicle computing device 114 and other computing devices.

The operating logic 842 may include an operating system and/or other software for managing components of the vehicle computing device 114. Similarly, as discussed above, the routing logic 144*a* may reside in the memory component 134 and may be configured to cause the processor 132 to determine location and/or routing of the vehicle. Similarly, the travel time logic 144*b* may be utilized to determine the waypoints and additional times of travel related to the waypoints.

It should be understood that while the components in FIG. 8 are illustrated as residing within the vehicle computing device 114, this is merely an example. In some embodiments, one or more of the components may reside external to the vehicle computing device 114. It should also be understood that, while the vehicle computing device 114 is illustrated as a single device, this is also merely an example. In some embodiments, the routing logic 144*a* and the travel time logic 144*b* may reside on different computing devices. As an example, one or more of the functionalities and/or components described herein may be provided by a remote computing device 804 and/or user computing device 806, which may be coupled to the vehicle 102 via a network 800, which may be embodied as a wide area network and/or local area network.

Additionally, while the vehicle computing device 114 is illustrated with the routing logic 144a and the travel time logic 144b as separate logical components, this is also an example. In some embodiments, a single piece of logic may cause the vehicle computing device 114 to provide the described functionality.

As illustrated above, various embodiments for estimating time of arrival for vehicle navigation are disclosed. These embodiments allow for dynamic alteration of travel times and routes to a destination. Embodiments disclosed herein also enable more accurate travel times and estimated times of arrival for a vehicle to a destination.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein. It should now be understood that embodiments disclosed herein are merely exemplary and are not intended to limit the scope of this disclosure.

What is claimed is:

1. A method for estimating time of arrival for vehicle navigation comprising:
   determining, by a computing device, a route for a vehicle to reach a destination from a current location;
   determining, by the computing device, an estimated time for reaching the destination from the current location;
   determining, by the computing device, a current range of the vehicle, based on a current fuel level and a vehicle fuel efficiency;
   determining, by the computing device, based on the current range, and after the vehicle has traveled a portion of the planned route, whether the vehicle can reach the destination without refueling;
   in response to determining that the vehicle cannot reach the destination without refueling, revising, by the computing device, the estimated time for reaching the destination to include a waypoint to refuel, wherein revising the estimated time includes calculating a time that the vehicle will be stopped at the waypoint; and
   providing, by the computing device, the estimated time for reaching the destination for display to a user.

2. The method of claim 1, further comprising predicting a user-based waypoint.

3. The method of claim 2, wherein the user-based waypoint comprises at least one of the following: a restroom stop, a restaurant stop, and a site seeing establishment stop.

4. The method of claim 2, wherein the user-based waypoint is determined from at least one of the following: a scheduling user input to schedule the waypoint for a future time, an impromptu user input to identify a stop at a present time, a determination based on previous user actions, and an action of the vehicle.

5. The method of claim 4, further comprising storing user actions associated with the waypoint and wherein determining the user-based waypoint from previous user actions comprises utilizing previously stored user actions for predicting the waypoint along the route.

6. The method of claim 4, wherein determining the user-based waypoint from the action of the vehicle comprises determining that the vehicle is taking an impromptu waypoint without previous indication, determining a nature of the waypoint, and altering the estimated time for reaching the destination.

7. The method of claim 4, further comprising, in response to determining that the vehicle cannot reach the destination without refueling, rerouting the vehicle to account for the waypoint.

8. A system for estimating time of arrival for vehicle navigation comprising:
   an odometer for determining distances traveled by the vehicle; a fuel gauge for determining a current fuel level of the vehicle; and
   a computing device, wherein the computing device stores logic that, when executed by a processor, causes the computing device to perform at least the following:
   determine a distance for reaching a destination from a current location;
   determine a current range of the vehicle, based on the current fuel level and a vehicle fuel efficiency;
   determine, after the vehicle has traveled a portion of the planned route and based on the current range, whether the vehicle can reach the destination without refueling;
   in response to determining that the vehicle cannot reach the destination without refueling, determine an estimated time for reaching the destination, wherein the estimated time for reaching the destination includes travel time to waypoint to refuel and a predicted time that the vehicle will be stopped at the waypoint; and
   provide the estimated time for reaching the destination for display to a user.

9. The system of claim 8, wherein the logic further causes the computing device to predict at least one of the following: a user-based waypoint and a vehicle-based waypoint.

10. The system of claim 9, wherein the user-based waypoint comprises at least one of the following: a restroom stop, a restaurant stop, and a site seeing establishment stop.

11. The system of claim 9, wherein the user-based waypoint is determined from at least one of the following: a scheduling user input to schedule the waypoint for a future time, an impromptu user input to identify a stop at a present time, a determination based on previous user actions, and an action of the vehicle.

12. The system of claim 11, wherein the logic further causes the computing device to store a user action associated with the waypoint and wherein determining the user-based waypoint from previous user actions comprises utilizing previously stored user actions for predicting the waypoint along a route of the vehicle.

13. The system of claim 11, wherein determining the user-based waypoint from the action of the vehicle comprises determining that the vehicle is taking an impromptu waypoint without previous indication, determining a nature of the waypoint, and altering the estimated time for reaching the destination.

14. The system of claim 9, wherein, in response to determining that the vehicle cannot reach the destination without refueling, the logic further causes the computing device to reroute the vehicle to account for the waypoint.

15. A system for estimating time of arrival for vehicle navigation comprising:
   a vehicle; and
   a computing device, wherein the computing device stores logic that, when executed by a processor, causes the computing device to perform at least the following:

determine an estimated time for reaching a destination from a current location;

predict, after the vehicle has traveled a portion of a route to the destination, whether a waypoint will be taken before reaching the destination;

in response to determining that the vehicle will take the waypoint before reaching the destination, revise the estimated time for reaching the destination to include the wherein revising the estimated time includes calculating a time that the vehicle will be stopped at the waypoint; and provide the estimated time for reaching the destination for display to a user.

16. The system of claim 15, wherein determining whether the waypoint will be taken before reaching the destination comprises at least one of the following: predicting a user-based waypoint and predicting a vehicle-based waypoint.

17. The system of claim 16, wherein the user-based waypoint comprises at least one of the following: a restroom stop, a restaurant stop, and a site seeing establishment stop and wherein the vehicle-based waypoint comprises at least one of the following: refueling, vehicle maintenance, and a weather-related stop.

18. The system of claim 16, wherein the user-based waypoint is determined from at least one of the following: a scheduling user input to schedule the waypoint for a future time, an impromptu user input to identify a stop at a present time, a determination based on previous user actions, and an action of the vehicle.

19. The system of claim 18, wherein the logic further causes the computing device to store a user action associated with the waypoint and wherein determining the user-based waypoint from previous user actions comprises utilizing previously stored user actions for predicting the waypoint along a route of the vehicle.

20. The system of claim 18, wherein determining the user-based waypoint from the action of the vehicle comprises determining that the vehicle is taking an impromptu waypoint without previous indication, determining a nature of the waypoint, and altering the estimated time for reaching the destination.

* * * * *